(12) United States Patent
Asayama

(10) Patent No.: US 10,166,820 B2
(45) Date of Patent: Jan. 1, 2019

(54) PNEUMATIC TIRE

(71) Applicant: TOYO TIRE & RUBBER CO., LTD., Osaka-shi, Osaka (JP)

(72) Inventor: Yoshinori Asayama, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 37 days.

(21) Appl. No.: 15/342,693

(22) Filed: Nov. 3, 2016

(65) Prior Publication Data

US 2017/0136828 A1 May 18, 2017

(30) Foreign Application Priority Data

Nov. 18, 2015 (JP) ................................. 2015-225956

(51) Int. Cl.
*B60C 11/12* (2006.01)
*B60C 11/03* (2006.01)
*B60C 11/11* (2006.01)

(52) U.S. Cl.
CPC ........ *B60C 11/1204* (2013.01); *B60C 11/032* (2013.01); *B60C 11/11* (2013.01); *B60C 11/1259* (2013.01); *B60C 2011/1254* (2013.01)

(58) Field of Classification Search
CPC . B60C 11/12; B60C 11/1204; B60C 11/1218; B60C 2011/1231; B60C 2011/1254; B60C 11/1259; B60C 11/0381; B60C 11/0383; B60C 11/04; B60C 11/11
USPC .................................................. 152/209.16
See application file for complete search history.

(56) References Cited

U.S. PATENT DOCUMENTS

| | | | |
|---|---|---|---|
| 5,322,107 A | 6/1994 | Lagnier | |
| 6,478,062 B1 | 11/2002 | Schomburg | |
| 2005/0167022 A1 | 8/2005 | Hashimoto | |
| 2013/0037192 A1* | 2/2013 | Kouda | B60C 11/0306 152/209.18 |
| 2013/0048170 A1* | 2/2013 | Inoue | B60C 11/1204 152/209.15 |

FOREIGN PATENT DOCUMENTS

| | | | |
|---|---|---|---|
| CN | 102328556 A | | 1/2012 |
| DE | 4426950 | * | 2/1996 |
| JP | 62-6802 | * | 1/1987 |
| JP | 6-501223 A | | 2/1994 |
| JP | 8-238911 | * | 9/1996 |
| JP | 11-165507 | * | 6/1999 |
| JP | 2000-25421 A | | 1/2000 |
| JP | 2000-233612 | * | 8/2000 |
| JP | 2003-127618 | * | 5/2003 |

(Continued)

OTHER PUBLICATIONS

Office Action dated Apr. 20, 2018, issued in counterpart Chinese Application No. 201610964318.0, with English translation. (14 pages).

*Primary Examiner* — Eric Hug
(74) *Attorney, Agent, or Firm* — Westerman, Hattori, Daniels & Adrian, LLP

(57) ABSTRACT

A pneumatic tire has a plurality of polygonal shallow grooves. The polygonal shallow grooves are formed on a surface of a land portion of a tread surface, for constructing closed loops. The plurality of polygonal shallow grooves formed on one of the land portions have internal regions which are independent of each other.

7 Claims, 6 Drawing Sheets

(56) References Cited

FOREIGN PATENT DOCUMENTS

| | | | |
|---|---|---|---|
| JP | 2004-34903 A | | 2/2004 |
| JP | 2007-216816 A | | 8/2007 |
| JP | 2010-120586 | * | 6/2010 |

* cited by examiner

PNEUMATIC TIRE

BACKGROUND OF THE INVENTION

Field of the Invention

The present invention relates to a pneumatic tire in which shallow grooves are formed on a surface of a land portion of a tread surface.

Description of the Related Art

In a winter tire or an all-season tire, a rubber having a high friction coefficient is employed in a tread surface for the purpose of enhancing a traveling performance on an ice road surface. However, in order to sufficiently achieve an effect thereof, a running-in travel for about several hundreds of km is required. Accordingly, in order to achieve the performance from an initial state in which the running-in travel is not performed, there has been known an application of a so-called first edge process which forms shallow grooves on a surface of a land portion of the tread surface. Even in a summer tire, there is a case that the first edge process is applied for the purpose of improving the traveling performance on a wet road surface.

As the first edge process, there have been known a mode that the shallow grooves are linearly formed as disclosed in patent document 1, and a mode that the shallow grooves are formed like a grid as disclosed in patent document 2. However, since the formation of the shallow grooves lowers a rigidity of the surface portion of the land portion, the surface portion of the land portion tends to locally topple at the braking time or the turning time. As a result, a ground contact performance is deteriorated, and there is a case that an edge effect caused by the shallow grooves can not be sufficiently achieved. Therefore, the performance can be expected to be improved by suppressing the toppling of the surface portion of the land portion.

Patent document 3 describes a structure in which oval cuts are concentrically formed on the tread surface. However, it is difficult to densely arrange a plurality of cuts each having the oval shape. Furthermore, patent document 4 describes a structure in which polygonal shallow grooves are concentrically formed as the first edge process. However, since the structure is only formed independently of each of blocks, a density at which the shallow grooves are formed is lower than that in the modes in the patent documents 1 and 2, and there has been room for improvement on the achievement of the edge effect by the shallow grooves.

PRIOR ART DOCUMENT

Patent Document

Patent Document 1: JP-A-2004-34903
Patent Document 2: JP-A-2000-25421
Patent Document 3: JP-A-6-501223
Patent Document 4: JP-A-2007-216816

SUMMARY OF THE INVENTION

The present invention is made by taking the above actual condition into consideration, and an object of the present invention is to provide a pneumatic tire which can suppress toppling of a surface portion of a land portion on which shallow grooves are formed.

The object can be achieved by the following present invention. The present invention provides a pneumatic tire comprising a plurality of polygonal shallow grooves, formed on a surface of a land portion of a tread surface, for constructing closed loops, wherein the plurality of polygonal shallow grooves formed on one of the land portions have internal regions which are independent of each other. According to the structure, it is possible to suppress reduction of a rigidity in the surface portion of the land portion, and thus to suppress the toppling of the surface portion of the land portion at the braking time or the turning time. As a result, it is possible to lighten deterioration of the ground contact performance, and the edge effect caused by the shallow grooves can be appropriately achieved, thereby improving the traveling performance on the ice road surface or the wet road surface.

It is preferable that the polygonal shallow grooves are formed into a triangular shape, a quadrangular shape, a pentagonal shape or a hexagonal shape. Further, It is preferable that a groove width of the polygonal shallow groove is equal to or greater than a depth of the polygonal shallow groove.

The polygonal shallow grooves may have a structure in which a plurality of closed loops are arranged in a nested shape. In this case, if the inside closed loop is adapted to be eccentric in a leading side in relation to the outside closed loop in the polygonal shallow groove having the structure in which the rotating direction is designated and a plurality of closed loops are arranged in a nested shape, it is possible to enhance the effect of suppressing the toppling of the surface portion of the land portion at the braking time.

DETAILED DESCRIPTION OF THE PREFERRED EMBODIMENTS

An embodiment of the present invention will be explained with reference to the drawings.

Figure 1:
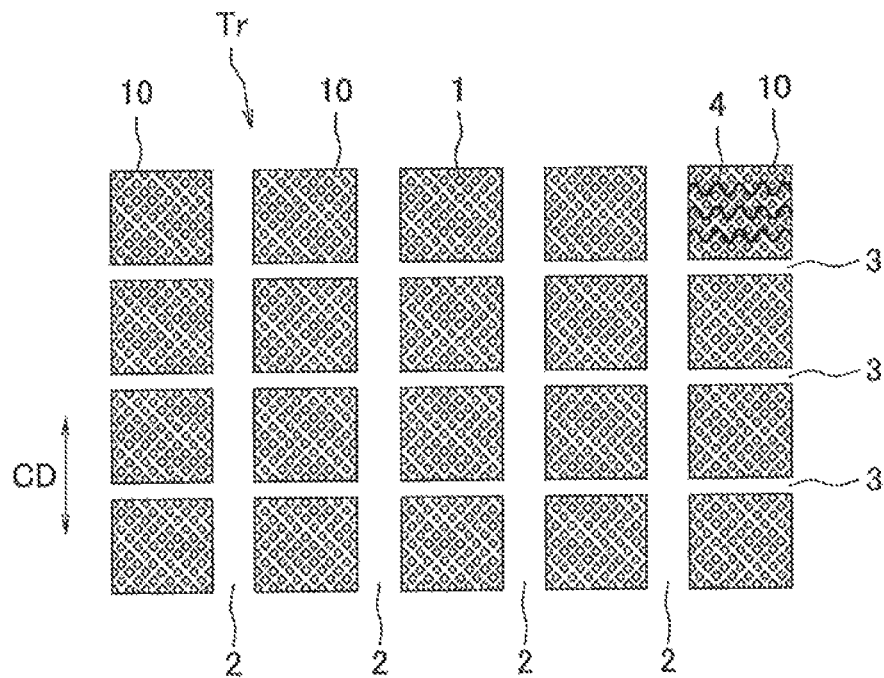
FIG. 1 is a plan view showing an example of a tread surface which is provided in a pneumatic tire according to the present invention.

In the present embodiment, a pneumatic tire having a tread surface Tr as shown in FIG. 1 is shown. The tread surface Tr is provided with a land portion which is constructed by a plurality of blocks 10, and a groove portion which is constructed by main grooves 2 and lateral grooves 3. The block 10 is comparted by the main grooves 2 which extend in a tire circumferential direction CD, and the lateral grooves 3 which extend in a direction intersecting the main grooves 2.

A cut-like sipe 4 is formed on a surface of each of the blocks 10. In FIG. 1, the sipe 4 is described only on an upper right block 10, and the description of the sipe 4 is omitted on the other blocks 10. The sipe 4 is mainly used to enhance a traveling performance on an ice road surface having a low friction coefficient. In the present embodiment, a wavy sipe 4 having both ends opening to edge of the block 10 is formed; however, the mode of the sipe is not limited to this.

Figure 2:
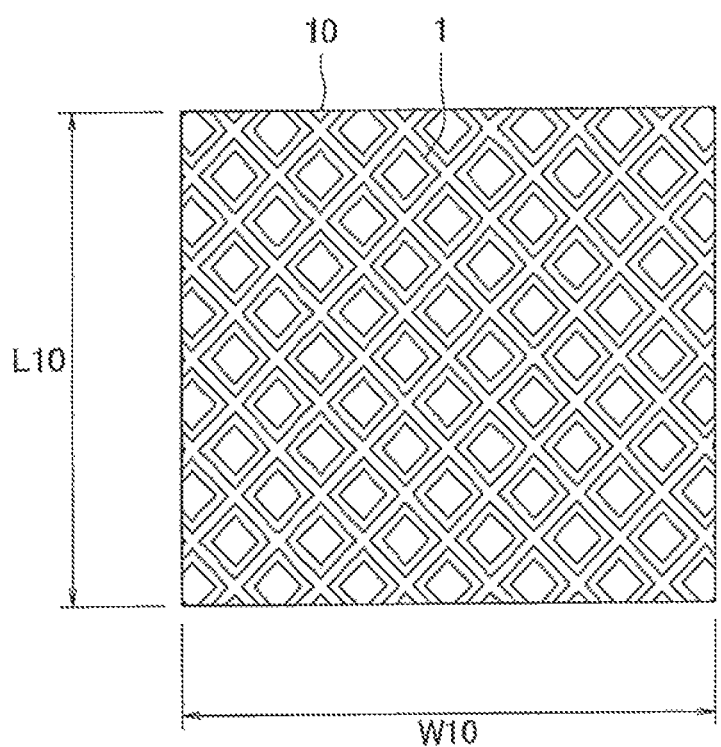
FIG. 2 is a plan view of a block.
Figure 3:
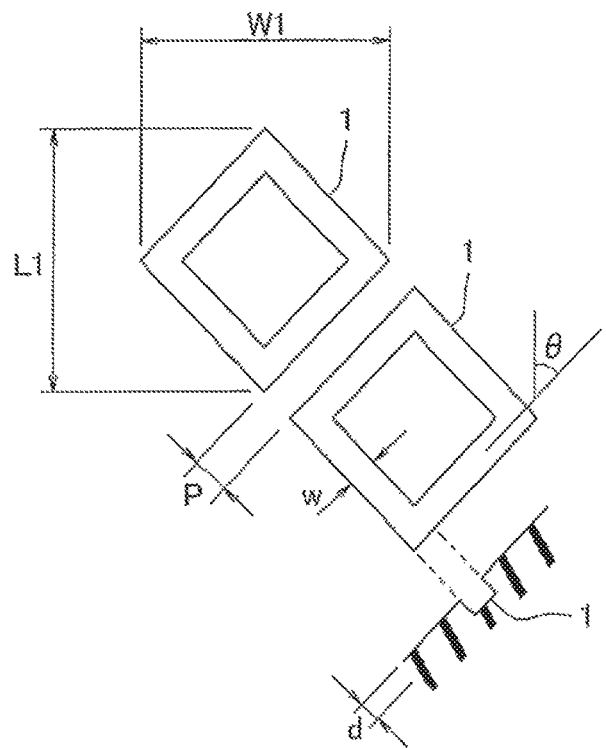
FIG. 3 is a plan view showing two polygonal shallow grooves which are extracted.

As shown in FIG. 2 in an enlarged manner, a plurality of polygonal shallow grooves 1 are formed on the surface of the block 10. The description of the sipe 4 is omitted in FIG. 2 and following drawings. In the embodiment, the polygonal shallow grooves 1 having the same shape and size are uniformly arranged, and two of them are extracted in FIG. 3. The polygonal shallow groove 1 constructs a closed loop, and does not come into contact with or intersect with the edge of the block 10 and the other polygonal shallow grooves. There are the shallow grooves which come into contact with the edges of the block 10 as shown in FIG. 2; however, they do not correspond to the polygonal shallow grooves which construct the closed loop.

Figure 4:
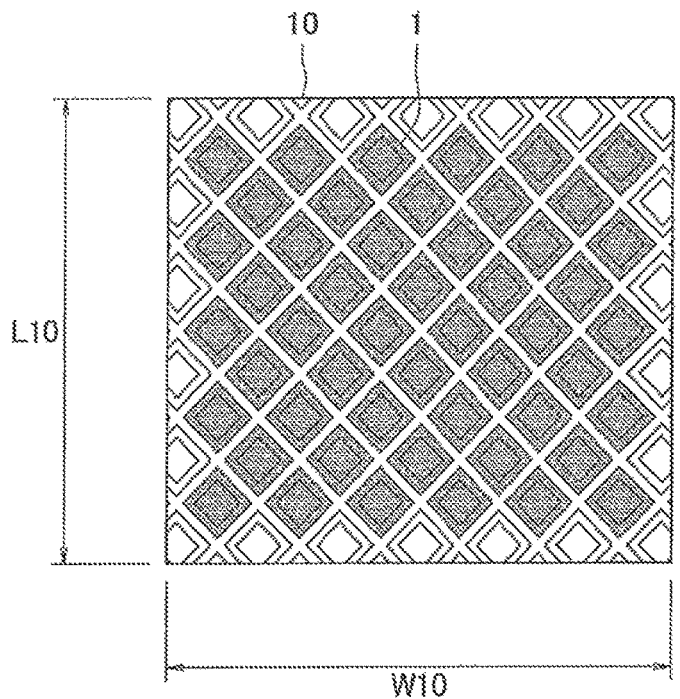
FIG. 4 is a plan view describing an internal region of the polygonal shallow groove.

Furthermore, a plurality of polygonal shallow grooves 1 formed in one block 10 each have internal regions which are independent of each other. The internal region means a region which is surrounded by outer edges of the polygonal shallow grooves 1. The internal regions of the polygonal shallow grooves 1 are colored by pale gray as shown in FIG. 4. As mentioned above, the internal regions of a plurality of polygonal shallow grooves 1 are separated from each other and are independent of each other.

Figure 11:
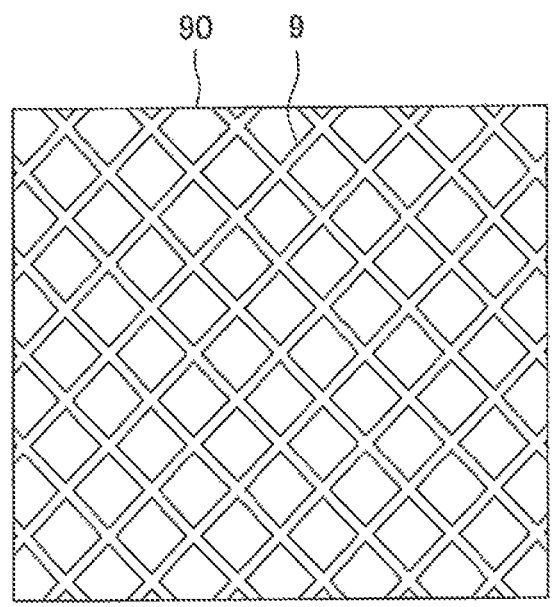
FIG. 11 is a plan view of a block which is provided in a test tie according to a comparative example 1.

In the present embodiment, since the regions interposing between the polygonal shallow grooves 1 expand like a net and go around wholly particularly as shown in FIGS. 2 and 4, it is possible to suppress reduction of rigidity of the surface portion of the block 10 and thus to inhibit the surface portion of the block 10 from toppling at the braking time or the turning time. As a result, it is possible to reduce deterioration of a ground contact performance, an edge effect caused by the shallow grooves can be appropriately achieved, and it is possible to improve the traveling performance on the ice road surface and the wet road surface. On the contrary, since the surface portion is divided finely in the block 90 on which the grid-like shallow grooves 9 are formed as shown in FIG. 11, the rigidity is lowered, and the surface portion of the block 90 tends to locally topple at the braking time or the turning time.

Furthermore, since the shallow groove 1 is formed into the polygonal shape in the present embodiment, it is possible to achieve the edge effect in many directions and thus to achieve a more excellent edge effect than the case that the shallow groove is formed into the circular shape (including the oval shape). Furthermore, since the shallow grooves can be densely arranged in comparison with the case that the shallow groove is formed into the circular shape, it is possible to easily enhance the forming density of the shallow grooves, as well as the structure in which a plurality of polygonal shallow grooves 1 formed in one block 10 have the internal regions which are independent of each other.

The polygonal shallow grooves 1 are formed shallower than the groove portions (the main grooves 2 and the lateral grooves 3), and contribute to the traveling performance on the ice road surface and the wet road surface in an initial state in which running-in travel is not performed, particularly in a brand-new state. A depth d of the polygonal shallow groove 1 is set, for example, within a range from 1% and 30% (inclusive) of the deepest groove depth in the groove portion (that is, the depth of the main groove 2), and more practically set within a range from 1.0% to 6.0% (inclusive).

In the present embodiment in which the sipe 4 is formed on the surface of the block 10, the depth d of the polygonal shallow groove 1 is set smaller than the depth of the sipe 4. The depth of the sipe 4 is set, for example, within a range from 6.0 mm to 9.0 mm (inclusive), and the depth d of the polygonal shallow groove 1 is smaller than the range, and is set, for example, to 4.5 mm or less, preferably 1.5 mm or less. Furthermore, in order to appropriately achieve the edge effect, the depth d of the polygonal shallow groove 1 is preferably set to be equal to or more than 0.1 mm, and more preferably set to be equal to or more than 0.2 mm.

A groove width w (refer to FIG. 3) of the polygonal shallow groove 1 is set within a range from, for example, 50% to 300% (inclusive) of the depth d of the polygonal shallow groove 1, and preferably set within a range from 100% to 300% (inclusive). In order to suppress the toppling of the surface portion of the block 10, the groove width w is preferably equal to or larger than the depth d of the polygonal shallow groove 1. The groove width w is set, for example, to be equal to or less than 4.5 mm, and preferably equal to or less than 1.5 mm. Furthermore, in order to appropriately achieve the edge effect, the groove width w is preferably set to be equal to or more than 0.1 mm and more preferably set to be equal to or more than 0.3 mm.

As mentioned above, a plurality of polygonal shallow groove 1 are formed in one block 10, in the tire. The number of the polygonal shallow grooves formed in one land portion is not particularly limited, but is preferably three or more, more preferably six or more, and further preferably twelve or more.

In the view of the formation of a plurality of polygonal shallow grooves 1 in one land portion, a length L1 (refer to FIG. 3) of the polygonal shallow groove 1 is preferably equal to or less than 50% of a length L10 (refer to FIG. 2) of the block 10, and more preferably equal to or less than 25%. The lengths L1 and L10 are measured along the tire circumferential direction CD. In the same point of view, a width W1 of the polygonal shallow groove 1 is preferably equal to or less than 50% of a width W10 of the block 10, and more preferably equal to or less than 25%. The widths W1 and W10 are measured along a tire width direction. In the present embodiment, since the length L1 is greater than the width W1, the effect of suppressing the toppling of the surface portion of the block 10 at the braking time can be enhanced.

In the view of the suppression of the rigidity reduction of the surface portion of the block 10, a pitch P (refer to FIG. 3) is preferably set to be equal to or more than 0.3 mm, and more preferably set to be equal to or more than 0.6 mm. Furthermore, in the view of the enhancement of the forming density of the shallow grooves, the pitch P is set to be equal to or less than 5.0 mm, and more preferably set to be equal to or less than 2.5 mm. The pitch P i s measured as a minimum distance between an outer edge of the polygonal shallow groove 1 and an outer edge of the adjacent polygonal shallow groove 1.

On the assumption that an area of the surface of the land portion (the block 10 in the present embodiment) is denoted by S1, and a total area of the internal regions of the polygonal shallow grooves 1 formed on the surface of the land portion is denoted by S2, a rate S2/S1 of these areas is preferably set to be equal to or more than 30%, more preferably set to be equal to or more than 40%, and further preferably set to be equal to or more than 50%, in order to secure the edge effect caused by the shallow grooves. In FIG. 4, the area S1 can be calculated by multiplying the length L10 by the width W10, and the area S2 can be calculated by summing the areas of the regions which are colored by the pale gray.

The polygonal shallow groove 1 preferably includes at least one side in which an inclination angle θ (refer to FIG. 3) to the tire circumferential direction CD is in a rage from 10 degrees to 70 degrees (inclusive), and more preferably includes a plurality of such sides. As a result, the edge components to the tire circumferential direction CD and the tire width direction are secured, and it is possible to improve both the braking performance and the turning performance in a balanced manner. Furthermore, it can be thought, for example, to set the inclination angle θ within a range from 61 degrees to 89 degrees (inclusive) in order to effectively enhance the braking performance, or to set the inclination angle θ within a range from 10 degrees to 41 degrees (inclusive) in order to effectively enhance the turning performance.

In the present embodiment, there is shown the example in which the shallow grooves are uniformly formed on the surface of the block 10; however, the structure is not limited to this. For example, in an embodiment shown in FIG. 5, the polygonal shallow grooves 1 are formed in a peripheral edge portion of a block 20; however, the shallow groove is not formed in a center portion of the block 20. As a result, the shallow grooves are unevenly formed as a whole. On the ice road surface having the low friction coefficient, the ground contact pressure tends to be higher in the center portion than in the peripheral edge portion of the block. Therefore, according to the structure in FIG. 5, the ground contact performance can be improved by facilitating the uniformization of the ground contact pressure in a whole of the block 20.

Figure 5:
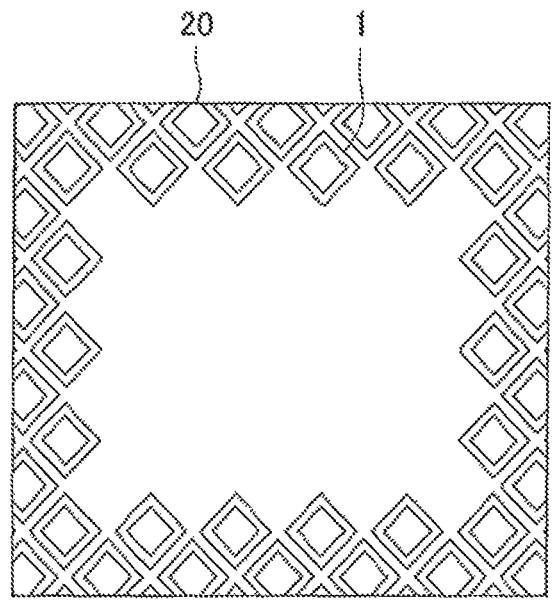
FIG. 5 is a plan view of a block in the other embodiment according to the present invention.

In the embodiments shown in FIGS. 2 and 5, there is shown the example in which a plurality of polygonal shallow grooves 1 having the same shape and size are formed; however, the polygonal shallow grooves having the different sizes can be formed in one land portion. For example, in an embodiment shown in FIG. 6, on a surface of a block 30, there are formed polygonal shallow grooves 5 having greater length and width than the polygonal shallow grooves 1 mentioned above together with the polygonal shallow grooves 1.

Figure 6:
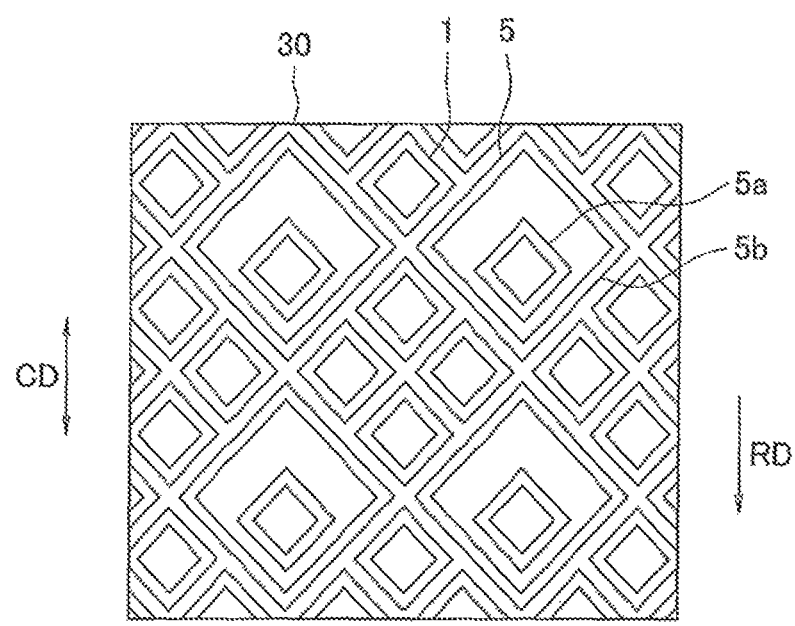
FIG. 6 is a plan view of a block in the other embodiment according to the present invention.

In the example of FIG. 6, the polygonal shallow groove 5 has a structure in which a plurality of closed loops are arranged in a nested shape. The polygonal shallow groove 5 has a double structure in which two closed loops are arranged in a nested shape, however, maybe a triple structure or a quadruple structure. A plurality of closed loop arranged in the nested shape, that is, an inside closed loop 5a and an outside closed loop 5b are provided in a multi-layered manner so as to be spaced from each other. Center positions of the closed loops 5a and 5b are differentiated in FIG. 6, however, may conform to each other.

In the present embodiment, the example in which the rotating direction is designated is shown, and the rotating direction is expressed by an arrow RD. A forward side (a lower side in FIG. 6) in the rotating direction RD becomes a leading side of the block 30, and a rearward side (an upper side in FIG. 6) in the rotating direction RD becomes a trailing side of the block 30. As shown in FIG. 6, the inside closed loop 5a is eccentric to the leading side in relation to the outside closed loop 5b in the polygonal shallow groove 5 having the structure in which a plurality of closed loops 5a and 5b are arranged in a nested shape. As a result, in the internal region of the polygonal shallow groove 5, the rigidity in the trailing side can be secured while the edge effect is enhanced in the leading side, and the effect of suppressing the toppling of the surface portion of the block 30 at the braking time can be enhanced. The designation of the rotating direction is carried out, for example, by attaching a mark (for example, an arrow) indicating the rotating direction to an outer surface of a side wall portion of the tire.

Figure 7:
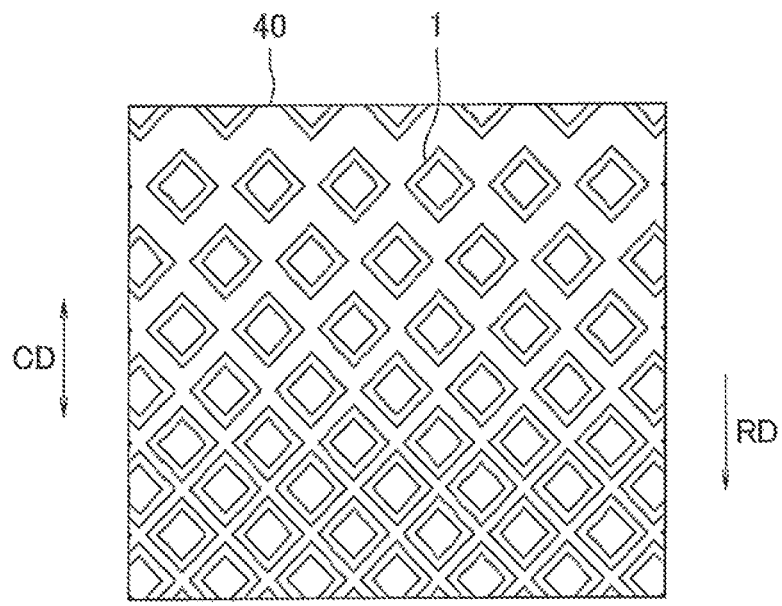
FIG. 7 is a plan view of a block in the other embodiment according to the present invention.

FIG. 7 shows an example in which a rotating direction is designated and a plurality of polygonal shallow grooves 1 constructing closed loops are formed on a surface of a block 40. In this embodiment, an interval between the polygonal shallow grooves 1 in a tire circumferential direction CD is greater in a leading side region in comparison with a trailing side of the block 40. According to the structure mentioned above, the rigidity in the trailing side can be secured while the edge effect is enhanced in the leading side, and the effect of suppressing the toppling of the surface portion of the block at the braking time can be enhanced.

Figure 8:
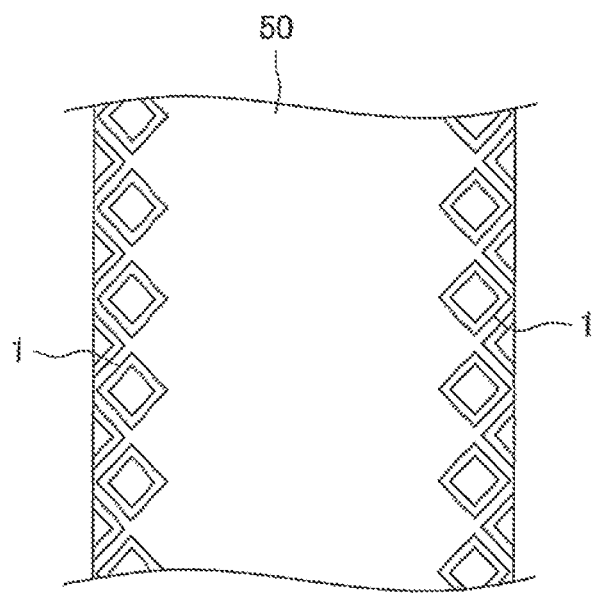
FIG. 8 is a plan view of a rib in the other embodiment according to the present invention.

The land portion on which the polygonal shallow grooves are formed is not limited to the block, but maybe a rib. FIG. 8 shows an example in which a plurality of polygonal shallow grooves 1 constructing closed loops are formed on a surface of a rib 50 which extends along a tire circumferential direction. In this embodiment, the polygonal shallow grooves 1 are arranged along both edge portions of the rib 50 in which the ground contact performance tends to be deteriorated.

A shape of the polygonal shallow groove in a plan view is not limited to a rhombic shape (one kind of the quadrangular shapes) as described above, but can employ the other polygonal shapes. However, in the case that the polygonal shallow groove is formed into a heptagonal shape or more polygonal shapes in the structure in which a plurality of polygonal shallow grooves are formed in one land portion, the shape of the shallow groove comes close to a circle and the advantage caused by the polygonal shape is hard to be obtained. Therefore, the polygonal shallow groove is preferably formed into a triangular shape, a quadrangular shape, a pentagonal shape or a hexagonal shape. The shape of the polygonal shallow grooves formed in one land portion is not limited to one kind, but plural kinds of polygonal shapes may be mixed.

Figure 9:
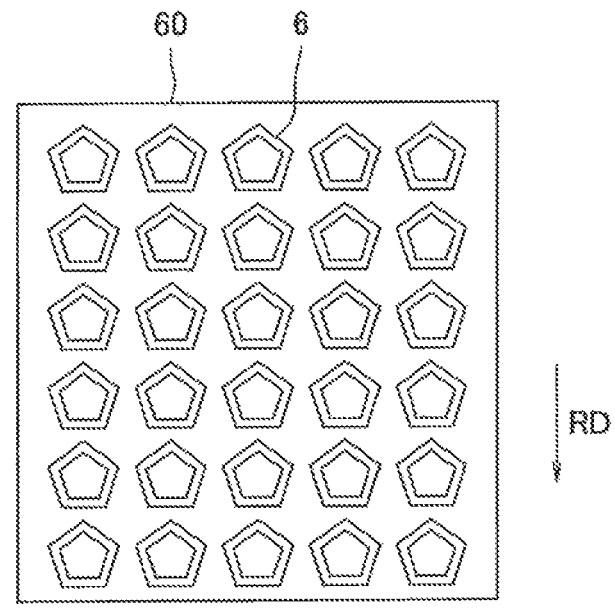
FIG. 9 is a plan view of a block in the other embodiment according to the present invention.

FIG. 9 shows an example in which a plurality of polygonal shallow grooves 6 constructing closed loops are formed on a surface of a block 60 and each of the polygonal shallow grooves 6 is formed into a pentagonal shape. In this embodiment, a rotating direction is designated, one side extending in a tire width direction is steered to a leading side among five sides included in the polygonal shallow groove 6, and two V-shaped sides inclined to the tire width direction are steered to a trailing side. As mentioned above, it is possible to enhance an edge effect of the shallow grooves 6 at the braking time by making an inclination angle of the side in relation to the tire width direction smaller in the leading side than in the trailing side.

Figure 10:
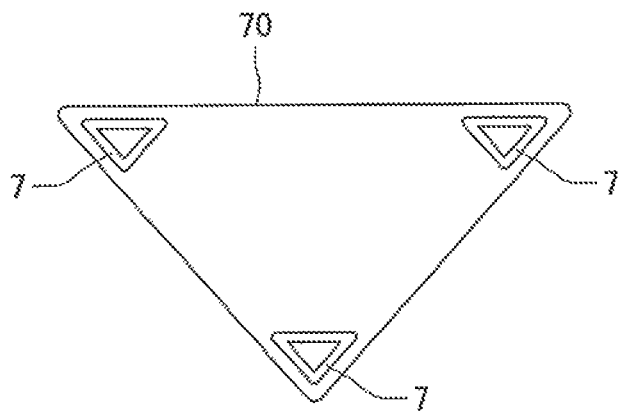
FIG. 10 is a plan view of a block in the other embodiment according to the present invention.

The shape of the land portion on which the polygonal shallow grooves are formed is not limited to a rectangular shape as described above, but may be formed into the other shapes such as a parallelogram and a hexagonal shape. FIG. 10 shows an example in which a plurality of polygonal shallow grooves 7 constructing closed loops are formed on a surface of a block 70 which is formed into a triangular shape, and each of the polygonal shallow grooves 7 is formed into a triangular shape. In this embodiment, the polygonal shallow grooves 7 are arranged in a corner portion of the block 70 in which the ground contact performance tends to be deteriorated.

The pneumatic tire according to the present invention is identical to the normal pneumatic tire except the matter that the polygonal shallow grooves as mentioned above are formed on the surface of the land portion, and the conventionally known materials, shapes and structures can be all employed in the present invention.

The pneumatic tire according to the present invention is useful for a winter tire and an all-seal tire, however, can be applied to a summer tire.

The present invention is not limited to the embodiment mentioned above, but can be improved and modified variously within the scope of the present invention.

EXAMPLES

An example which concretely shows the structure and effect of the present invention will be explained. An evaluation of each of performances is executed as follows.
(1) Ice Braking Performance A test tire was attached to a vehicle (4WD middle sedan car of 1500 cc class) and was charged with a pneumatic pressure 220 kPa, a braking distance when an ABS was actuated by applying a braking force at a speed 40 km/h while the vehicle travels on an ice road surface was measured, and an inverse number thereof was calculated. Results are indicated by an index number on the assumption that a result of a comparative example 1 is set to 100, and as the numerical value is larger, the ice braking performance is more excellent.
(2) Ice Turning Performance A test tire was attached to a vehicle (4WD turning measurement vehicle of 2491 cc class) and was charged with the pneumatic pressure 220 kPa, a linear travel was performed at a speed 20 km/h by traveling on the ice road surface, and a cornering force was measured by turning a steering wheel until the tire was locked near approach of the corner. Results are indicated by an index number on the assumption that a result of the comparative example 1 is set to 100, and as the numerical value is larger, the ice turning performance is more excellent.
(3) Wet Braking Performance A test tire was attached to the same vehicle (as mentioned above) and was charged with the pneumatic pressure 220 kPa, braking distance when the ABS was actuated by applying a braking force at a speed 100 km/h while the vehicle travels on a wet road surface was measured, and an inverse number thereof was calculated. Results are indicated by an index number on the assumption that a result of the comparative example 1 is set to 100, and as the numerical value is larger, the wet braking performance is more excellent.

The comparative example 1 and working examples 1 to 3 were obtained by variously differentiating the modes of the shallow grooves formed on the surface of the block in a pneumatic tire having a tire size of 195/65R15. In the test tires, a width and a depth of the shallow grooves and a structure of a sipe were common, and all the test tires were evaluated in a brand-new state in which the running-in travel was not executed. Results of evaluation are shown in Table 1.

TABLE 1

|  | Comparative Example 1 | Working Example 1 | Working Example 2 | Working Example 3 |
| --- | --- | --- | --- | --- |
| Shape of shallow groove | FIG. 11 | FIG. 2 | FIG. 5 | FIG. 6 |
| Ice braking performance | 100 | 103 | 101 | 105 |
| Ice turning performance | 100 | 106 | 102 | 106 |
| Wet braking performance | 100 | 102 | 101 | 103 |

As shown in Table 1, each of the traveling performances is improved in the working examples 1 to 3 in comparison with the comparative example 1. Particularly, a greater improvement effect of the braking performance can be obtained in the working example 3 in comparison with the working examples 1 and 2.

What is claimed is:

1. A pneumatic tire comprising a plurality of polygonal shallow grooves, formed on a surface of a land portion of a tread surface, for constructing closed loops, wherein the plurality of polygonal shallow grooves formed on one of the land portions have internal regions which are independent of each other, and
wherein the depth of the polygonal shallow groove is smaller than the depth of a sipe formed on the surface of the land portion.

2. The pneumatic tire according to claim 1, wherein the polygonal shallow grooves are formed into a triangular shape, a quadrangular shape, a pentagonal shape or a hexagonal shape.

3. The pneumatic tire according to claim 1, wherein a groove width of the polygonal shallow groove is equal to or greater than a depth of the polygonal shallow groove.

4. The pneumatic tire according to claim 1, wherein the polygonal shallow grooves have a structure in which a plurality of closed loops are arranged in a nested shape.

5. The pneumatic tire according to claim 4, wherein a rotating direction is designated, and
wherein an inside closed loop is eccentric to a leading side in relation to an outside closed loop, in the polygonal shallow groove having the structure in which the plurality of closed loops are arranged in the nested shape.

6. The pneumatic tire according to claim 1, wherein a depth of the polygonal shallow groove is within a range from 1% and 30% of the depth of a main groove.

7. The pneumatic tire according to claim 1, wherein the depth of the polygonal shallow groove is 4.5 mm or less.

* * * * *